United States Patent [19]

Duke et al.

[11] Patent Number: 5,011,421
[45] Date of Patent: Apr. 30, 1991

[54] PLANE CHANGE CONNECTOR ASSEMBLY

[75] Inventors: Jonathan W. Duke, Lancaster; Barry R. Richards, Greenwood, both of S.C.

[73] Assignee: Westinghouse Electric Corp., Pittsburgh, Pa.

[21] Appl. No.: 489,132

[22] Filed: Mar. 5, 1990

[51] Int. Cl.⁵ .................. H01R 4/60; H01R 25/00
[52] U.S. Cl. .................. 439/213; 439/115; 439/114; 174/71 B
[58] Field of Search ............ 439/110, 115, 119, 121, 439/210, 114, 213, 212, 801; 174/68.2, 70 B, 71 B, 87; 361/355, 361

[56] References Cited

U.S. PATENT DOCUMENTS 3,732,523  5/1973  Fouse et al. .................. 439/114
4,097,103  6/1978  Krause .......................... 439/213

FOREIGN PATENT DOCUMENTS 2423068  12/1979  France ......................... 174/87

Primary Examiner—David L. Pirlot
Assistant Examiner—Julie R. Daulton
Attorney, Agent, or Firm—M. J. Moran

[57] ABSTRACT

A plane change connector assembly is provided which connects electrical busbars which are in different planes. The assembly includes a connector which has at least one coupling flange cantilevered from one side of a planar joining member. A second coupling flange is cantilevered from the other side of the planar joining member in a different plane from the first coupling flange and preferably, in a plane at a right angle to the plane of the first coupling flange. The connector can be used as part of an assembly for connecting multiphase systems having multiple co-planar busbars for each phase. In this preferred form, the connector is provided with multiple coupling flanges, and a connector is associated with each phase of the system. The co-planar busbars for each phase are connected with plates which in turn engage the first coupling flanges of the connector. Similar plates engage the second coupling flanges which are in a different plane from the first coupling flanges and the two systems which are in different planes are thereby connected.

17 Claims, 3 Drawing Sheets

PLANE CHANGE CONNECTOR ASSEMBLY

BACKGROUND OF THE INVENTION

1. Field of The Invention

This invention relates to a connector assembly for electrical components which provides the ability to connect the components to other components which are in a different plane. The assembly is particularly relevant to busbars in multiconductor, three phase systems.

2. Background of The Invention

It is often necessary in the electric power generating industry to connect two components together which are lying in different planes. This arises regarding connection of busbars. An electrical busway consisting of three busbars per phase and one set of three busbars for the neutral line is commonly used in the industry. However, different configurations of busways may be required by customers. As a result, a busway is often a custom-built product designed to meet specific customer requirements. In many cases, these requirements necessitate that the bus be rotated or twisted into a different plane in order to clear an obstacle, redirect the phasing or connect the busway to some other type of electrical equipment.

Currently, the method generally used to accomplish this rotation is to employ a number of brazed and bent copper connectors inside of a junction box in which the busway is housed. Many different copper connectors are required to physically connect every busbar of each phase to every busbar for the corresponding phase of the other system. For example, in three-busbar-per-phase busways, twelve such connectors are required— three per phase and three for neutral—to be placed in the junction box. It is often the case that none of the twelve connectors are exactly alike. Each connector requires separate detailed drafting and must be custom fabricated.

The fabrication of the brazed and bent connectors is extremely difficult. It is almost impossible to keep to a required dimension after the copper is bent and brazed together. This can create a great deal of difficulty when the connectors are assembled in the unit. Each connector must also have an insulating material applied to it.

Overall, the brazed and bent connectors currently in use can be cumbersome and difficult to make. They can also present assembly problems, and they can have very limited application. Therefore, there remains a need for a connecting device which is simple to make and which can be used universally for each busbar of the particular busway used in the application. There remains a need for a device which provides the capability to easily effect a change in the orientation of the busway.

SUMMARY OF THE INVENTION

These and other needs are satisfied by the invention which includes a plane change connector device for connecting one electrical component to another where the electrical components have outwardly extending bars which bars are in different geometric planes. The connector consists of a component of a single design which can be used in many different applications.

More particularly, the connector consists of a plane change connector which has at least one outwardly extending coupling flange and preferably, the device has have a first set of coupling flanges which are spaced apart and parallel to one another. This first set of coupling flanges is cantilevered from a joining member which is in a plane perpendicular to the first set of flanges. On the opposite side of the joining member at least one and preferably, a second set of parallel coupling flanges is cantilevered, and those flanges are rotated through an angle, typically ninety degrees, from the first set of flanges and are also perpendicular to the plane of the joining member.

In accordance with another aspect of the invention, the connectors are used in a combination involving multi-bar systems in which case two rectangular plates are secured to the coupling flanges and extend outwardly therefrom. In a three-bar-per-phase system, the plates electrically connect the three co-planar busbars for one phase. The plates for each phase are stacked in parallel planes. The busbars for a second busway which are in a plane different from the plane of the first busway, can then be received between similarly mounted plates on the second set of flanges of the connector.

Suitable fastening means are provided to secure the various elements together.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENTS

Figure 1:
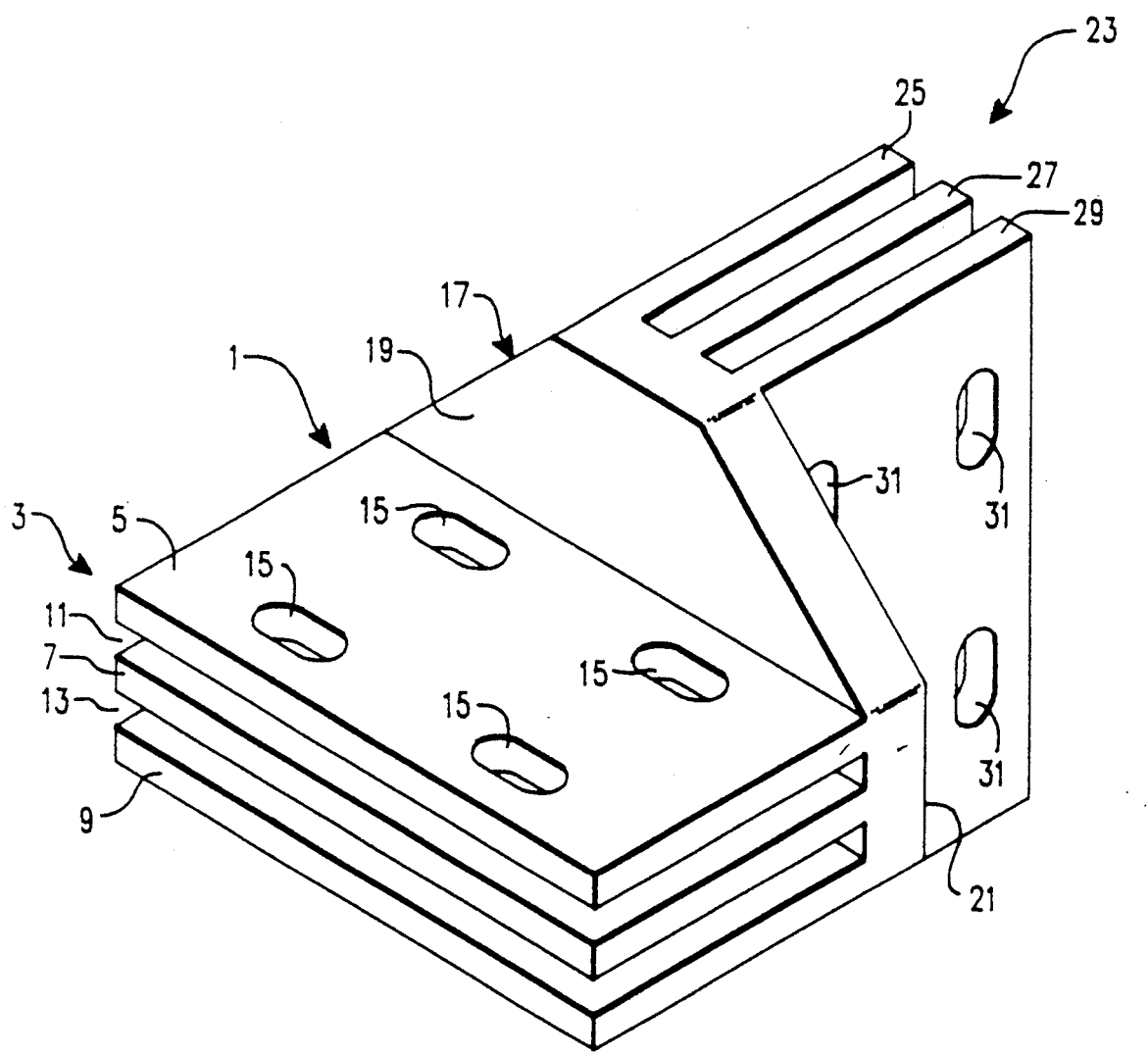
FIG. 1 is an isometric view of the plane change connector of the present invention.

Referring now to FIG. 1, connector 1 has a first set 3 of coupling flanges comprising separate, parallel coupling flanges 5, 7 and 9. Space 11 is defined between flanges 5 and 7, and space 13 is defined between flanges 7 and 9. Each flange 5, 7 and 9 has apertures 15 therethrough adapted to receive fastening means (not shown) discussed in greater detail hereinafter.

Connector 1 also has planar joining member 17. Joining member 17 has two opposing sides 19 and 21. Coupling flanges 5, 7 and 9 are cantilevered from side 19. Joining member 17 is in a plane perpendicular to the parallel planes of flanges 5, 7 and 9.

On the opposing side 21 of joining member 17, a second set 23 of parallel coupling flanges comprised of individual flanges 25, 27 and 29 is cantilevered. Flanges 25, 27 and 29 are at right angles to joining member 17 and are also at right angles to the first set of plates 3. In other words, there is a ninety degree change in the plane between the first coupling flange and the second set of coupling flanges. It should be understood that the second set of coupling flanges may be at a different angle than a ninety degree angle from said first coupling flanges, depending upon the application.

Coupling flanges 25, 27 and 29 are also provided with apertures 31 for receiving fastening means as discussed hereinafter.

Figure 2:
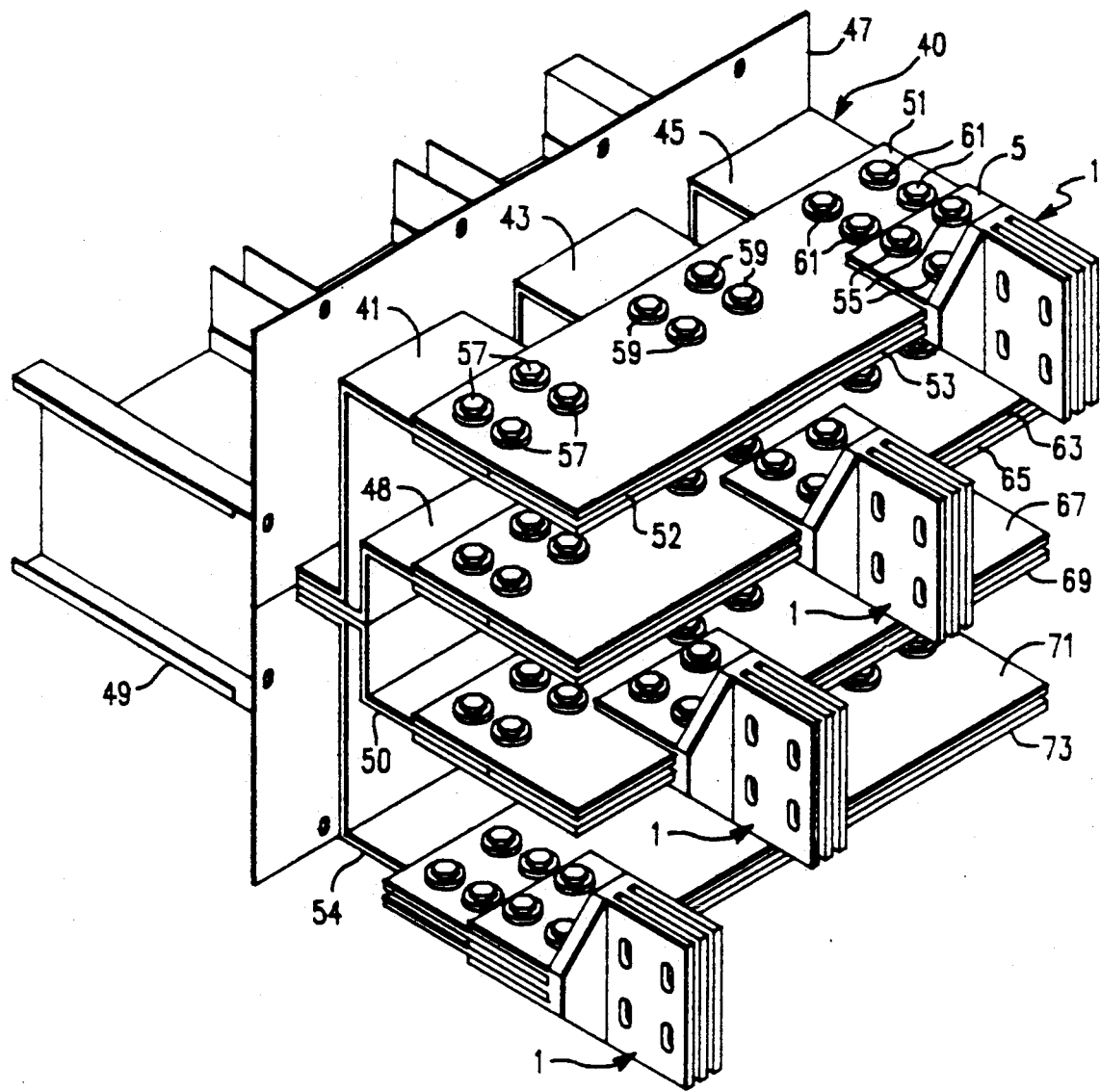
FIG. 2 is an isometric view of an exemplary embodiment of part of a connector assembly of the present invention for a multiphase, multiple-busbar-per-phase busway.

Referring now to FIG. 2, an exemplary embodiment of the present invention as used in conjunction with busway 40 is shown. Busway 40 has three conducting bars for each of three phases A, B and C and three bars for the neutral line. Bars 41, 43 and 45 are the three busbars for phase A. Similarly, three bars are provided for phases B which are collectively identified with reference character 48. Three busbars are also provided for phase C, and these are collectively identified with reference character 50. Similarly, the three busbars for the neutral line, N, are designated collectively by reference character 54. The bars are mounted on platform 47 which is supported by flange 49. It should be understood that any suitable support arrangement may be used depending upon the application.

Each phase A, B and C, and the neutral line N, is provided with a connector 1. For phase A, a connector 1 is provided with first ganging plate 51 and second ganging plate 53. First ganging plate 51 is received within the space 11 (FIG. 1) created between flange 5 and flange 7 (not shown in FIG. 2). Second ganging plate 53 is received within the space 13 (FIG. 1) created between flanges 7 and 9 (not shown in FIG. 2), thereby creating a sleeve; busbars 41, 43 and 45 for phase A are then sandwiched between first plate 51 and second plate 53.

The connector 1 is held in place by bolts 55 which are received through the apertures 15 in each flange 5, 7 and 9 and corresponding apertures in first plate 51 and second plate 53 (not visible in FIG. 2). Suitable fasteners such as bolts 57 are received in corresponding apertures in bar 41 and first plate 51 and second plate 53. The same type of fastening is provided with bolts 59 for bar 43, and bolts 61 for bar 45.

Similarly, for phase B, first plate 63 and second plate 65 straddle the co-planar bars 48 for that phase and for phase C, first plate 67 and second plate 69 straddle the three co-planar bars 50 for phase C. And similarly, plates 71 and 73 are provided for the three neutral conducting bars, 54.

In order to maintain the ampere rating carried from one busway to the next, the preferred embodiment of the connector 1 of FIG. 1 has a particular configuration and cross-sectional area. Referring to phase A of the assembly of FIG. 2, the three plates 5, 7 and 9 each have a cross-sectional area equal to the cross-sectional area of the busbars 41, 43 and 45 of FIG. 2. In addition, ganging plates 51 and 53 also have the same cross sectional area as the busbars. Further, the space 52 between plates 51 and 53 is also equal to the cross sectional area so that the plates can straddle the busbars as discussed hereinbefore. Further, as would be understood by those skilled in the art, the thickness of planar joining member 17 (FIG. 1) should be greater than the thickness of each busbar to carry sufficient current from the first set of flanges to the second set of flanges of the connector.

Figure 3:
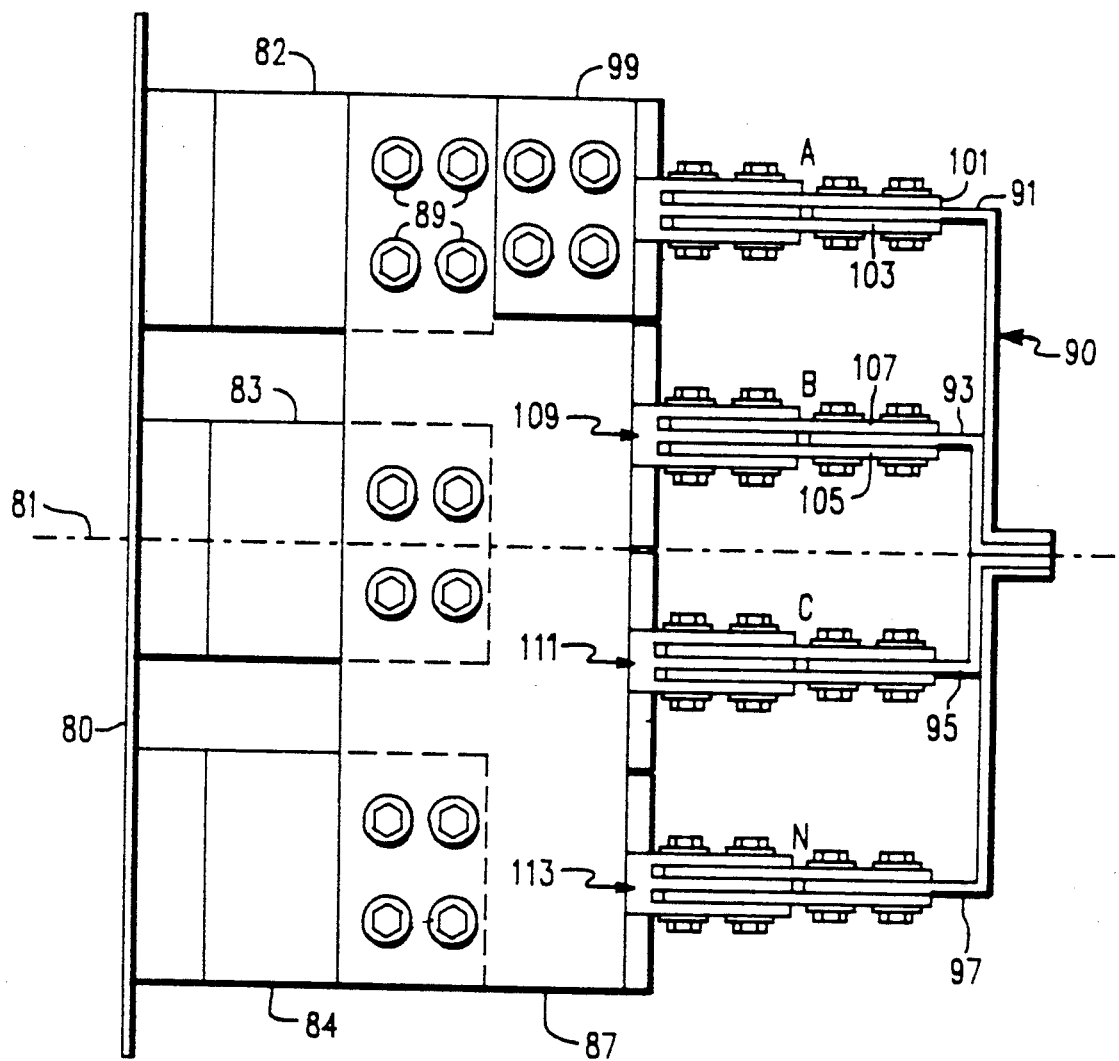
FIG. 3 is an enlarged top plan view of the connection assembly of the present invention with two busways oriented ninety degrees from one another.

FIG. 3 shows the assembly of the present invention connecting two three-phase systems with each phase of each system having three bars per phase. The neutral line also has three conducting bars. More particularly, the first system 80 has three phases. The first phase, A, has three co-planar busbars 82, 83 and 84. The other two phases B and C are not visible in FIG. 3. The busbars 82, 83 and 84 are "gang-connected" with connecting plate 87 in the manner discussed hereinbefore. A similar plate is provided underneath bars 82, 83 and 84, in the manner discussed hereinbefore with reference to FIG. 1. The bars are fastened to connecting plate 87 by bolts and nuts such as those designated by reference character 89.

The system 80 is connected to a similar busway system 90. System 90 is rotated 90 degrees about axis 81 as shown in FIG. 3. System 90 is also a three phase system with three bars for each phase. In the FIG. 3 busbar 91 is visible for phase A of system 90, busbar 93 is visible for phase B, and busbar 95 is visible for phase C. In addition, busbar 97 is visible for the neutral line, N. It should be understood that the other two bars for each phase of busway system 90 are gang-connected in the manner discussed hereinbefore.

A plane change connector device 99 connects the upper connecting plate 87 and the lower plate (not shown) of busway system 80 to a similar set of plates 101 and 103 for phase A of busway system 90. The busbars 91 and the other two co-planar busbars (not visible) are sandwiched between plates 101 and 103 and thereby they are connected in a manner sufficient to conduct the appropriate amount of current as discussed hereinbefore. Similarly, busbar 93 and corresponding co-planar busbars are connected by plates 105 and 107 which are held in the spaces and engaged by connector 109. The third phase, C, of the two systems is connected by connector 111. The neutral line 97 is connected by connector 113.

In operation, a plane change connector, such as that shown in FIG. 1, is to be used to connect the busbars of two busways and to effect a plane change, such as a ninety degree change of plane between busways. In the exemplary embodiment, which involves a three phase system having three bars per phase, the bars of each phase are joined with connecting plates such as 51 and 53 of FIG. 2. This is done for each phase of the two systems to be connected. This obviates the necessity of physically joining every bar of every phase with a separate connector member as required in the prior art design.

With the busbars in each phase gang-connected, a connector 1 (FIG. 1) of the present invention can be used to connect like phases of each system. Only three of the same type of connecting devices would be required and one for a neutral line, if desired. This is as opposed to twelve individually crafted connectors previously required.

As discussed above, the connecting devices 1 (FIG. 1) and the connecting plates 51, 53 (FIG. 2) are dimensioned so as to provide efficiency of transfer of current between the connected systems.

Individual devices could also be used to connect single bar systems and in such a case, the connecting plates 51, 53 (FIG. 2) would not be required. It should also be understood that the bars of the two systems could be at angles other than ninety degrees from one another. For example, the busbars may be rotated forty-five degrees about axis 81 (FIG. 3). In that case, the second set of coupling flanges 23, 25 and 27 on each connector 1 (FIG. 1) would be similarly rotated forty-five degrees.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A connecting device for connecting a first electrical component having multiple co-planar bars extending outwardly in a first plane to a second electrical component also having multiple co-planar bars extending outwardly in a second plane which is at an angle to the first plane, said connecting device comprising:

a plane change member having a first coupling flange means for engaging the bar of said first electrical component, a planar joining member having two opposing sides, said joining member being in a plane perpendicular to said first coupling flange means and having said first coupling flange means cantilevered from one side of said joining member, a second coupling flange means being in a different plane from said first coupling flange means and being cantilevered from the opposing side of said joining member at right angles to said joining member, said second coupling flange means engaging the bar of said second electrical component;

connecting means for securing the bar of said first electrical component to the first coupling flange means and for securing the bar of said second electrical component to the second coupling flange means;

a first ganging plate means for connecting the multiple co-planar bars of said first electrical component to said first coupling flange means of said plane change member; and a second ganging plate means for connecting the multiple co-planar bars of said second electrical component to said second coupling flange means of said plane change member.

2. The device of claim 1 for connecting a first electrical component having multiple co-planar bars each of equal, predetermined cross section, and said second electrical component having multiple co-planar bars each of equal cross section, wherein said first coupling flange means of said plane change member has a total cross section equal to the aggregate of the cross sections of the co-planar bars of said first electrical component, and said second coupling flange means has a total cross section equal to the aggregate of the cross sections of the co-planar busbars of said second electrical component.

3. The device of claim 1, wherein said first coupling flange means of said plane change member comprises multiple spaced-apart parallel flanges defining spaces between each of said flanges; and wherein said second coupling flange means of said plane change member comprises multiple spaced-apart parallel flanges defining spaces between each of said flanges, and wherein said first ganging plate means of said connecting means comprises a first pair of ganging plates, each plate of said pair being received within one of said spaces between said flanges of said first coupling flange means, and said plates straddling all of the co-planar bars of said first electrical component therebetween to electrically connect all of said co-planar bars to said plane change member; and wherein said second ganging plate means of said connecting means comprises a second pair of ganging plates, each plate of said pair being received within one of said spaces between said flanges of said second coupling flange means, and said plates straddling all of the co-planar bars of said second electrical component therebetween to electrically connect all of said co-planar bars to said plane change member; and wherein said connecting means further comprises:

first fastening means for fastening said first pair of ganging plates to said flanges of said first coupling flange means and said second pair of ganging plates to said flanges of said second coupling flange means; and second fastening means for fastening each of said pairs of plates to said co-planar bars of said electrical components.

4. The device of claim 3 wherein said first plane of said bar of said first electrical component is at a right angle to the second plane of said bar of said second electrical component.

5. The device of claim 3 for connecting a first electrical component having multiple co-planar bars each of said predetermined cross section, and said second electrical component having multiple co-planar bars each of equal cross-section, wherein said first coupling flange means comprises a number of spaced-apart parallel flanges equal to the number of co-planar bars of said first busway, said coupling flanges each having said predetermined cross-section; and wherein said second coupling flange means comprises a number of spaced-apart parallel flanges equal to the number of co-planar bars of said second busway, said coupling flanges each having said predetermined cross-sections.

6. The device of claim 5 wherein said first ganging plate means having said first pair of plates being of said predetermined cross-section, and said second ganging plate means having said second pair of plates being of said predetermined cross-section.

7. A busbar connecting assembly for connecting a first three-phase busway having multiple co-planar outwardly extending busbars for each phase, with the busbars for each phase spaced apart from one another and stacked in separate, parallel planes to a second, three-phase busway also having multiple co-planar outwardly extending busbars for each phase with the busbars for each phase spaced apart from one another and stacked in separate, parallel planes at a predetermined angle to the planes of said parallel planes of the first busway, the connecting assembly comprising:

a plane change member associated with each phase, each plane change member having a plurality of spaced-apart first coupling flanges parallel to a first plane, a planar joining member having two opposing sides, said joining member being in a plane perpendicular to said first coupling flanges and having said first coupling flanges cantilevered from one side of said joining member, a plurality of spaced-apart second coupling flanges parallel to a second plane which is at the predetermined angle to said first plane, and said second coupling flanges being cantilevered from the opposing side of said joining member;

connecting means associated with each phase, said associated connecting means for the first phase connecting the co-planar bars of the first phase of said first electrical components to said first coupling flanges of the associated plane change member for the first phase, and connecting the co-planar bars of the first phase of said second electrical component to said second coupling flanges of the associated plane change member for the first phase;

the associated connecting means for the second phase connecting the co-planar bars of the second phase of said first electrical component to said first coupling flanges of the associated plane change member for the second phase, and connecting the co-planar bars of the second phase of said second electrical component to said second coupling flange of the associated plane change member for the second phase;

the associated connecting means for the third phase connecting the co-planar bars of the third phase of said first electrical component to said first coupling flanges of the associated plane change member for the third phase, and connecting the co-planar bars of the third phase of said second electrical component to said second coupling flanges of the associated plane change member for the third phase;

a first ganging plate means associated with each phase, said first ganging plate means connecting the multiple co-planar bars of each phase of said first electrical component to the first coupling flanges of said associated plane change member for that phase;

a second ganging plate means associated with each phase, said second ganging plate means connecting the multiple co-planar bars associated with each phase of said second electrical component to the second coupling flanges of said associated plane change member for that phase;

first fastening means for securing said ganging plates to said coupling flanges; and second fastening means for securing said co-planar bars to said ganging plate.

8. The busbar assembly of claim 7 wherein each of said ganging plate means comprises;

a pair of substantially rectangular plates, each plate of said pair being received within one of said spaces between said coupling flanges, each said pair of plates forming a sleeve into which the co-planar busbars of said busways are received.

9. The busbar connecting assembly of claim 8 wherein the first busway has three outwardly extending co-planar busbars for each phase and the second busway has three outwardly extending coplanar busbars for each phase.

10. The busbar connecting assembly of claim 8 wherein said first busway also has a neutral line having multiple co-planar busbars in a plane parallel to the busbars for the three phases of said first busway, and said second busway having a neutral conductor having multiple co-planar busbars in a plane parallel to the busbars for the three phases of said second busway, the assembly comprising, a plane change member associated with the neutral line;

a first ganging plate means associated with said neutral line, said first ganging plate means connecting the multiple co-planar busbars of the neutral line of said first electrical component to the first coupling flanges of said associated plane change member, a second ganging plate means associated with said neutral line, said second ganging plate means connecting the multiple co-planar busbars of the neutral line of said second electrical component to said second coupling flanges of said associated plane change member;

first fastening means for securing said ganging plate means to said coupling flanges; and second fastening means for securing said co-planar bars to said ganging plate means member, each said pair forming a sleeve into which the co-planar busbars for the neutral line of said second busway are received.

11. The busbar connecting assembly of claim 10 wherein said first ganging plate means comprises:

a pair of substantially rectangular plates, each plate of said pair being received within one of said spaces between said first coupling flanges of said plane change member, each said pair of plates forming a sleeve into which the co-planar busbars for the neutral line of said first busway are received, and wherein said second ganging plate means comprises:

a pair of substantially rectangular plates, each plate of said pair being received within one of said spaces between said second coupling flanges of said plane change member, each said pair of plates forming a sleeve into which the co-planar busbars for the neutral line of said second busway are received.

12. The busbar connecting assembly of claim 11 wherein the co-planar busbars of said first busway are each of an equal, predetermined cross-section and said co-planar busbars of said second busway are each of an equal, predetermined cross section, wherein said plane change member further comprises:

three first coupling flanges, each having said predetermined cross section, and said flanges being spaced apart by a space equal to said predetermined cross section.

13. The busbar connecting assembly of claim 12 wherein said substantially rectangular plates of said first ganging plate means each have a cross-section equal to said predetermined cross-section, and said substantially rectangular plates of said second ganging plate means each have a cross-section equal to said predetermined cross section.

14. The busbar connecting assembly of claim 11 wherein said co-planar busbars of said first busway are each of an equal, predetermined cross-section and said co-planar busbars of said second busway are each of said predetermined cross-section, wherein said plane change member further comprises:

said first coupling flanges having an aggregate cross-section equal to the total of said predetermined cross-sections of said co-planar busbars of said first electrical component; and said second coupling flanges having an aggregate cross-section equal to the total of said predetermined cross-sections of said co-planar busbars of said second electrical component.

15. The busbar connecting assembly of claim 14 wherein said substantially rectangular plates of said first ganging plate means each have said predetermined cross-section, and said second ganging plate means each have said predetermined cross section.

16. The busbar connecting assembly of claim 11 wherein said coupling flanges have apertures through which said first fastening means are received and which correspond with apertures in said rectangular plates for receiving said first fastening means.

17. The busbar connecting assembly of claim 16 wherein said substantially rectangular plates have apertures through which said second fastening means are received and which correspond to apertures in said busbars for receiving said second fastening means.

* * * * *